US012491989B2

(12) United States Patent
Mitchell

(10) Patent No.: US 12,491,989 B2
(45) Date of Patent: Dec. 9, 2025

(54) SYSTEMS AND METHODS FOR CONTROLLING A FLIGHT CONTROL SURFACE OF AN AIRCRAFT

(71) Applicant: THE BOEING COMPANY, Chicago, IL (US)

(72) Inventor: Ira Mitchell, Seattle, WA (US)

(73) Assignee: The Boeing Company, Arlington, VA (US)

( * ) Notice: Subject to any disclaimer, the term of this patent is extended or adjusted under 35 U.S.C. 154(b) by 265 days.

(21) Appl. No.: 17/734,178

(22) Filed: May 2, 2022

(65) Prior Publication Data

US 2023/0348043 A1 Nov. 2, 2023

(51) Int. Cl.
*B64C 13/40* (2006.01)

(52) U.S. Cl.
CPC .................................... *B64C 13/40* (2013.01)

(58) Field of Classification Search
CPC ........... B64C 9/02; B64C 13/36; B64C 13/40; B64C 13/14
See application file for complete search history.

(56) References Cited

U.S. PATENT DOCUMENTS

2006/0049308 A1 3/2006 Good
2008/0191089 A1 8/2008 Reckslek
2009/0212158 A1 8/2009 Mabe
2013/0126670 A1* 5/2013 Vaghela .................... B64C 9/22 244/99.3
2018/0135717 A1* 5/2018 Fox ..................... F16F 15/1204
2018/0281929 A1* 10/2018 Popoola .................. B64C 13/28
2020/0156766 A1* 5/2020 Tzabari ..................... B64C 9/02

FOREIGN PATENT DOCUMENTS

EP 3246593 A1 * 11/2017 ............. B64C 13/40

OTHER PUBLICATIONS

Delfi, How the Braking System Works in a Car, How a Car Works, Jan. 1, 2020 (Year: 2020).*
Evoparagon, Braking System Fundamental of Braking System, Feb. 19, 2011 (Year: 2011).*
Extended European Search Report for EP App. No. 23170340.6-1004, dated Sep. 20, 2023.

* cited by examiner

*Primary Examiner* — Nicholas McFall
*Assistant Examiner* — Eric Acosta
(74) *Attorney, Agent, or Firm* — Joseph M. Butscher; The Small Patent Law Group LLC

(57) ABSTRACT

A system and a method include a flight control surface, an actuator configured to control motion of the flight control surface, and a brake configured to engage at least a portion of the flight control surface in response to the flight control surface disengaging from the actuator. The brake arrests unrestrained motion of the flight control surface when the brake engages the at least a portion of the flight control surface.

20 Claims, 4 Drawing Sheets

200
102
106
110
104
108
200
5
4
5
100
108
5
5
124 106 4 202

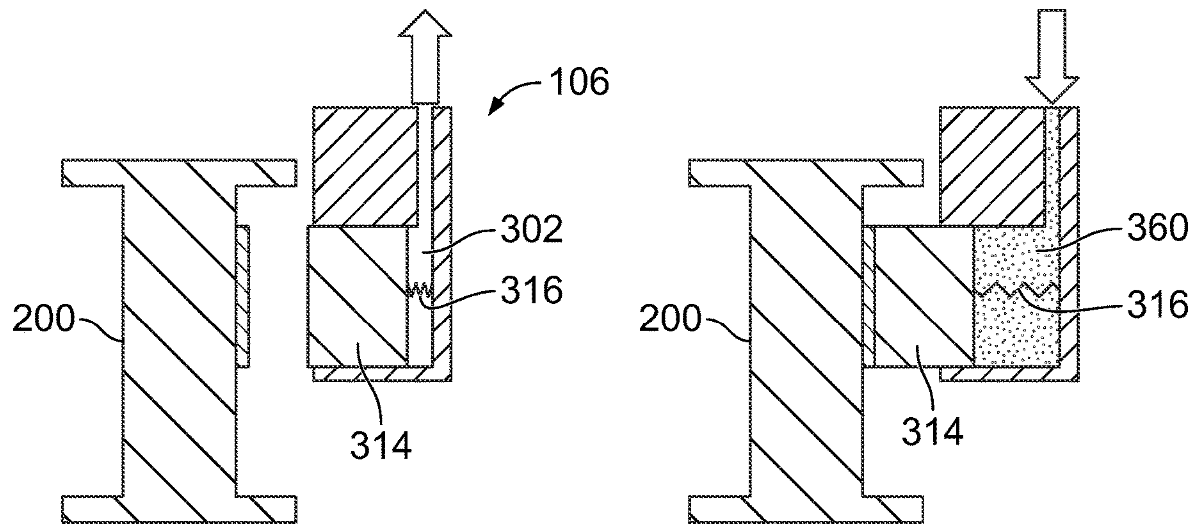
FIG. 7
FIG. 8
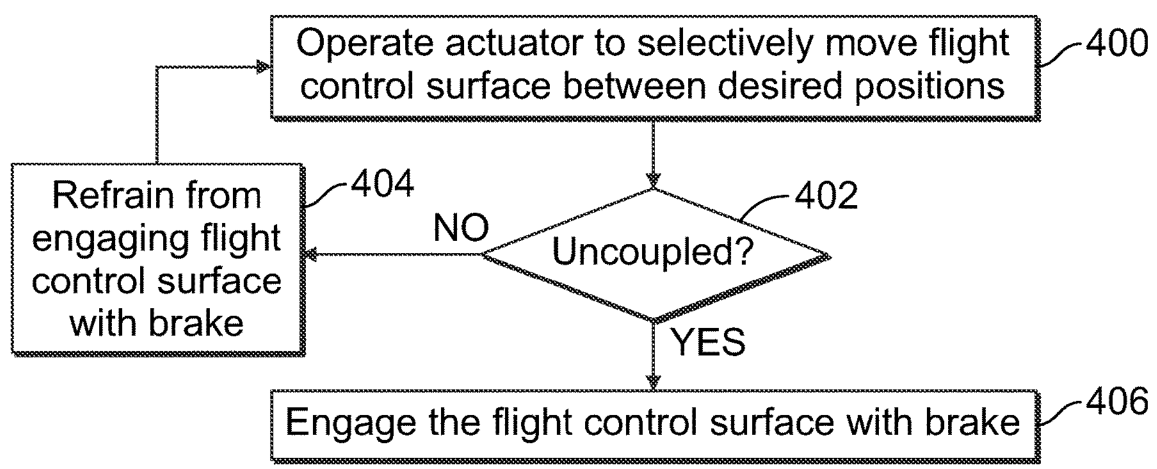
FIG. 9

SYSTEMS AND METHODS FOR CONTROLLING A FLIGHT CONTROL SURFACE OF AN AIRCRAFT

FIELD OF THE DISCLOSURE

Examples of the present disclosure generally relate to systems and methods for controlling flight control surfaces of aircraft, such as systems and methods for actively controlling hydraulic brake systems for flight control surfaces of aircraft.

BACKGROUND OF THE DISCLOSURE

Aircraft are used to transport passengers and cargo between various locations. An aircraft such as an airplane includes numerous flight control surfaces, which are aerodynamic devices that are adjustable to control attitude of the airplane during flight. One type of flight control surface is an aileron, which is mounted on a trailing edge of a wing. Another type of flight control surface is an elevator, which is a moveable portion of a horizontal stabilizer. A rudder is a moveable portion on a trailing edge of a vertical stabilizer. A flap is mounted on a trailing edge of an inboard section of a wing. A slat is a leading edge device that is an extension of the front of a wing.

An unrestrained slat condition refers to a scenario when the slat is able to freely move to any position based on air load without being able to be arrested. An unrestrained slat condition can occur when an actuator uncouples from the slat.

Known slat actuation designs can be bulky, costly, and complex. For example, the known slat actuation designs can incorporate dual rotary actuators with internal, passively engaged no-back brakes that prevent unrestrained slat conditions.

SUMMARY OF THE DISCLOSURE

A need exists for a system and a method that is configured to arrest unrestrained slat motion. Further, a need exists for a system and a method for effectively and efficiently arresting unrestrained slat motion, such as without the use of a secondary actuator or complex method of restraining free motion. Such systems and methods would provide significant cost, weight, and complexity savings over prior known systems and methods.

With those needs in mind, certain examples of the present disclosure provide a system including a flight control surface, an actuator configured to control motion of the flight control surface, and a brake configured to engage at least a portion of the flight control surface in response to the flight control surface disengaging from the actuator. For example, the brake is configured to engage at least a portion of a track of the flight control surface (that is, in at least one example, the flight control surface includes a track, such as an internal track). The brake arrests unrestrained motion of the flight control surface when the brake engages the at least a portion of the flight control surface.

In at least one example, the flight control surface is a slat of a wing, and the at least a portion is a track of the slat. In at least one example, the actuator is a linear hydraulic actuator.

In at least one example, the system also includes one or more sensors configured to detect a position of the flight control surface. The position of the flight control surface is used to determine whether the flight control surface is disengaged from the actuator.

In at least one example, the system also includes a control unit in communication with the brake. The control unit is configured to determine whether the flight control surface is disengaged from the actuator, and to control operation of the brake.

In at least one example, the brake is configured to engage the at least a portion of the flight control surface without the use of an additional actuator.

In at least one example, the brake includes a main housing disposed in relation to the at least a portion of the flight control surface. The main housing includes an internal chamber. One or more pistons are sealingly and moveably secured within one or more channels of the main housing. Hydraulic fluid is configured to pass into the internal chamber and force the one or more pistons into engagement with the at least a portion of the flight control surface. In at least one further example, the one or more pistons are tethered to the main housing by one or more springs within the internal chamber. In at least one example, the brake further includes a valve disposed on or within a fluid inlet to the internal chamber. In at least one further example, the fluid inlet is in fluid communication with a fluid delivery line in fluid communication with a fluid reservoir that retains the hydraulic fluid.

In at least one example, the one or more pistons include a first piston disposed to a first side of the at least a portion of the flight control surface, and a second piston disposed to a second side of the at least a portion of the flight control surface.

Certain examples of the present disclosure provide a method including controlling, by an actuator, motion of a flight control surface; engaging, by a brake, at least a portion of the flight control surface in response to the flight control surface disengaging from the actuator; and arresting, by said engaging, unrestrained motion of the flight control surface.

BRIEF DESCRIPTION OF THE DRAWINGS

FIG. 7 illustrates a cross-sectional view of a brake disengaged from a track through line 5-5 of FIG. 3, according to an example of the present disclosure.

FIG. 8 illustrates a cross-sectional view of the brake engaging the track through line 5-5 of FIG. 3, according to an example of the present disclosure.

FIG. 9 illustrates a flow chart of a method for controlling unrestrained motion of a flight control surface of an aircraft, according to an example of the present disclosure.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide systems and methods including a slat track braking mechanism configured to arrest control surface movement in the event of an actuator disconnection.

Figure 1:
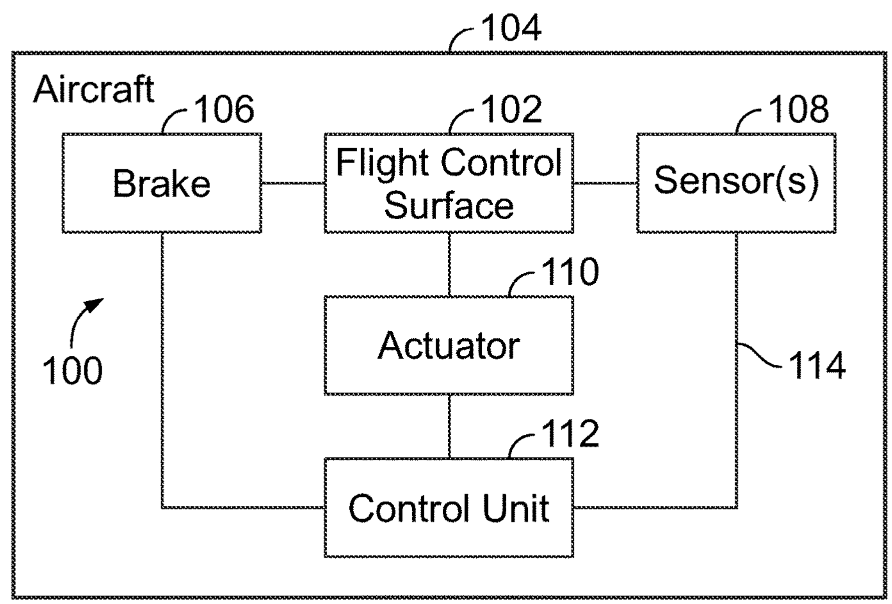
FIG. 1 illustrates a schematic block diagram of a system for controlling unrestrained motion of a flight control surface of an aircraft, according to an example of the present disclosure.

FIG. 1 illustrates a schematic block diagram of a system 100 for controlling unrestrained motion of a flight control surface 102 of an aircraft 104, according to an example of the present disclosure. The system 100 includes a brake 106 coupled to a portion of the flight control surface 102, such as a track of the flight control surface 102 that drives motion of the flight control surface 102. In at least one example, the flight control surface 102 is a slat, and the portion of the flight control surface 102 is a track of the slat. In at least one other example, the flight control surface 102 is an aileron. As another example, the flight control surface 102 is an elevator. As another example, the flight control surface 102 is a flap.

One or more sensors 108 are configured to detect a position of the flight control surface 102 (or a portion thereon). For example, the sensor(s) 108 can be an optical sensor, an ultrasonic sensor, a camera, an encoder, and/or the like that is configured to detect the position of one more portions of the flight control surface 102.

An actuator 110 is coupled to a portion of the flight control surface 102 and a fixed portion of the aircraft 104. For example, the actuator 110 can be secured to a fixed spar and a track of the flight control surface 102. In at least one example, the actuator 110 is a linear hydraulic actuator. In at least one example, the actuator 110 is coupled to the flight control surface 102 through one or more gears. The actuator 110 is configured to operate to move the flight control surface 102 between different positions, such as an extended position and a retracted position.

A control unit 112 is in communication with the brake 106, the sensor(s) 108 and the actuator 110, such as through one or more wired or wireless connections. The control unit 112 is configured to operate the brake 106 in response to detection of an unrestrained flight control surface condition, such as an unrestrained slat condition.

In operation, the actuator 110 is configured to move the flight control surface 102 in response to commands from a control system of the aircraft 104. The sensor(s) 108 detects the position of at least a portion of the flight control surface 102 and outputs position signals 114 indicative of the position to the control unit 112. The control unit 112 analyzes the position of the at least a portion of the flight control surface 102 based on the position signals 114 received from the sensor(s) 108 in relation to operation of the actuator 110. If the position of the one or more portions of the flight control surface 102 conforms to operation of the actuator 110 (for example, where the portion(s) should be in relation to the operation of the actuator 110), the control unit 112 refrains from operating the brake 106. If, however, the position of the one or more portions of the flight control surface 102 do not conform to the operation of the actuator 110, the control unit 112 determines that the actuator 110 is uncoupled from the flight control surface, thereby indicating an unrestrained condition of the flight control surface 102, and therefore operates the brake 106 to restrain motion of the flight control surface 102.

As described herein, the system 100 includes the flight control surface 102, the actuator 110 configured to control motion of the flight control surface 102, and the brake 106 configured to engage at least a portion of the flight control surface 102 in response to the flight control surface 102 disengaging from the actuator 110. The brake 106 arrests (for example, stops, prevents, minimizes, or otherwise reduces) unrestrained motion of the flight control surface 102 when the brake 106 engages the at least a portion of the flight control surface 102.

In at least one example, the brake 106 is configured to engage the at least a portion of the flight control surface 102 without the use of an additional actuator, motor, or the like. That is, the brake 106 is not coupled to an additional engine, actuator, or motor. Instead, the brake 106 can be controlled by hydraulics, and under the control of the control unit 112, as described herein. Because no additional actuators, engines, motors, or the like are used, the system 100 is lighter, less costly, and less complex than prior known systems.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 112 may be or include one or more processors that are configured to control operation, as described herein.

The control unit 112 is configured to execute a set of instructions that are stored in one or more data storage units or elements (such as one or more memories), in order to process data. For example, the control unit 112 may include or be coupled to one or more memories. The data storage units may also store data or other information as desired or needed. The data storage units may be in the form of an information source or a physical memory element within a processing machine.

The set of instructions may include various commands that instruct the control unit 112 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 112. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 112 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
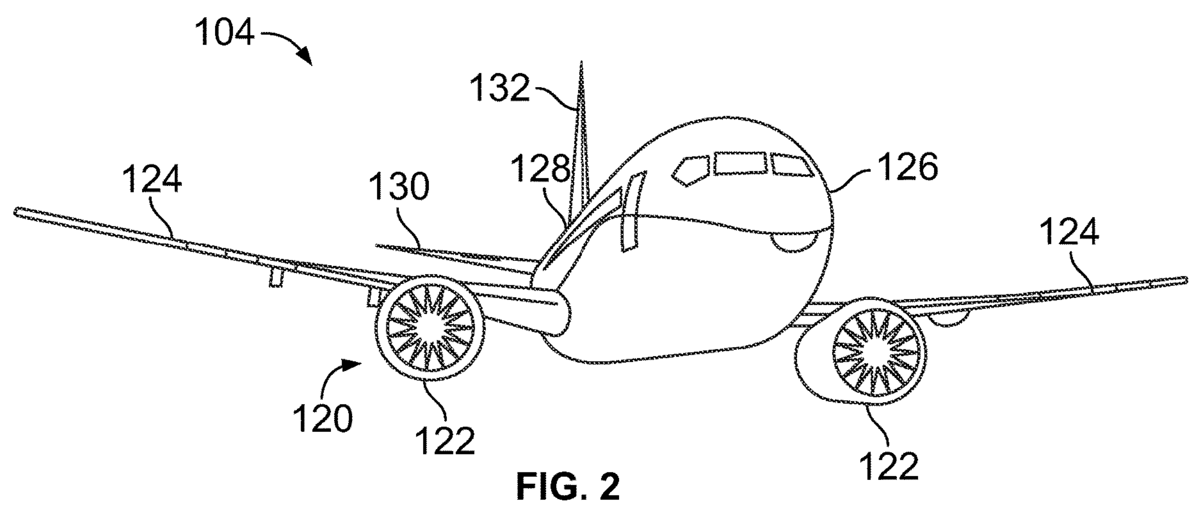
FIG. 2 illustrates a perspective front view of the aircraft, according to an example of the present disclosure.

FIG. 2 illustrates a perspective front view of the aircraft 104, according to an example of the present disclosure. The aircraft 104 includes a propulsion system 120 that includes engines 122, for example. Optionally, the propulsion system 120 may include more engines 122 than shown. The engines 122 are carried by wings 124 of the aircraft 104. In other embodiments, the engines 122 may be carried by a fuselage 126 and/or an empennage 128. The empennage 128 may also support horizontal stabilizers 130 and a vertical stabilizer 132. Referring to FIGS. 1 and 2, the system 100 can be used to control various flight control surfaces 102, such as slats and/or flaps of the wings 124, elevators of the horizontal stabilizers, a rudder of the vertical stabilizer 132, and/or the like. FIG. 2 shows an example of an aircraft 104. It is to be understood that the aircraft 104 can be sized, shaped, and configured differently than shown in FIG. 2.

Figure 3:
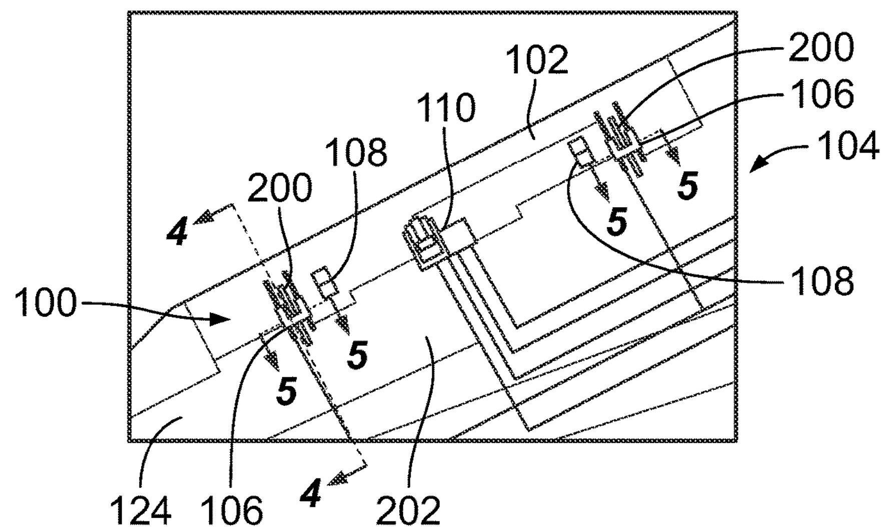
FIG. 3 illustrates a top internal view of a portion of a wing of the aircraft, according to an example of the present disclosure.

FIG. 3 illustrates a top internal view of a portion of a wing 124 of the aircraft 104, according to an example of the present disclosure. In at least one example, the wing 124 includes the system 100, which includes brakes 106 coupled to tracks 200 of the flight control surface 102. As shown in FIG. 3, the flight control surface 102 is a slat at a forward edge of the wing 124. The actuator 110 is a linear hydraulic actuator coupled to the tracks 200, such as through one or more linkages. In at least one example, the actuator 110 is directly connected to the slat, which includes the tracks 200. The actuator 110 is configured to push the slat out and pull the slat in, while the tracks 200 help guide the slat along a predetermined path. The linkages can include one or more gears. The sensors 108 are secured to fixed portions of the wing 124. For example, the sensors 108 are secured to a front spar extending from a main body 202 of the wing 124.

Figure 4:
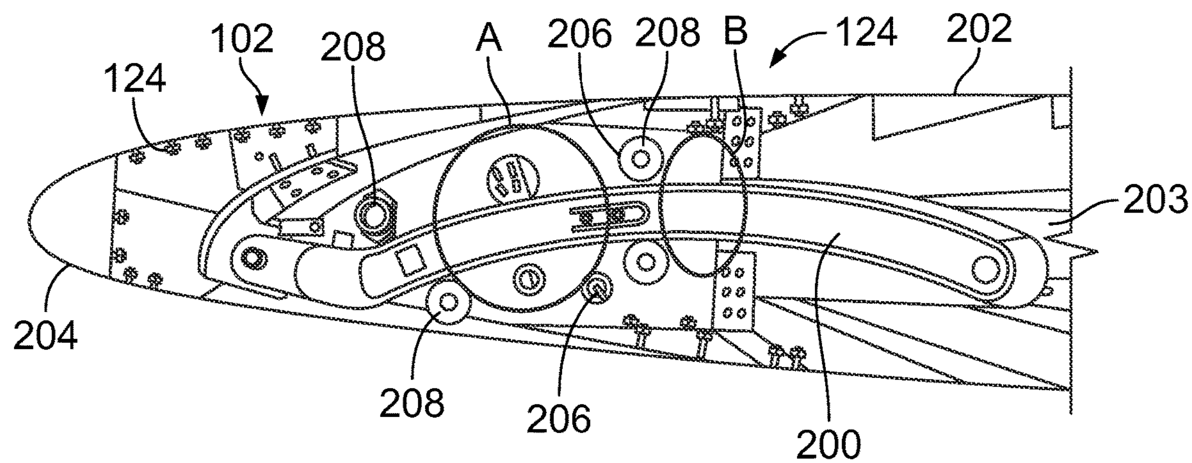
FIG. 4 illustrates a lateral internal view of the wing through line 4-4 of FIG. 3, according to an example of the present disclosure.

FIG. 4 illustrates a lateral internal view of the wing 124 through line 4-4 of FIG. 3, according to an example of the present disclosure. As noted, in at least one example, the flight control surface 102 is a slat at a forward edge of the wing 124. In this example, the flight control surface 102 includes an aerodynamic front edge 204 and the track 200 extending therefrom. Referring to FIGS. 3 and 4, the track 200 is coupled to the actuator 110. The main body 202 of the wing 124 includes ribs 206 that rotatably retain rollers 208. The ribs 206 can be secured to or otherwise extend from a front spar 203 of the main body 202. The track 200 is moveably coupled to the rollers 208. As the actuator 110 moves the track 200 of the flight control surface 102, the track 200 moves in relation to the rollers 208 to selectively move the flight control surface 102 between extended and retracted positions.

Each brake 106 can be secured to the main body 202, such as at positions along the ribs 206, and configured to engage the track 200. For example, the brake 106 can be mounted to the rib(s) 206 at positions A or B, for example.

Figure 5:
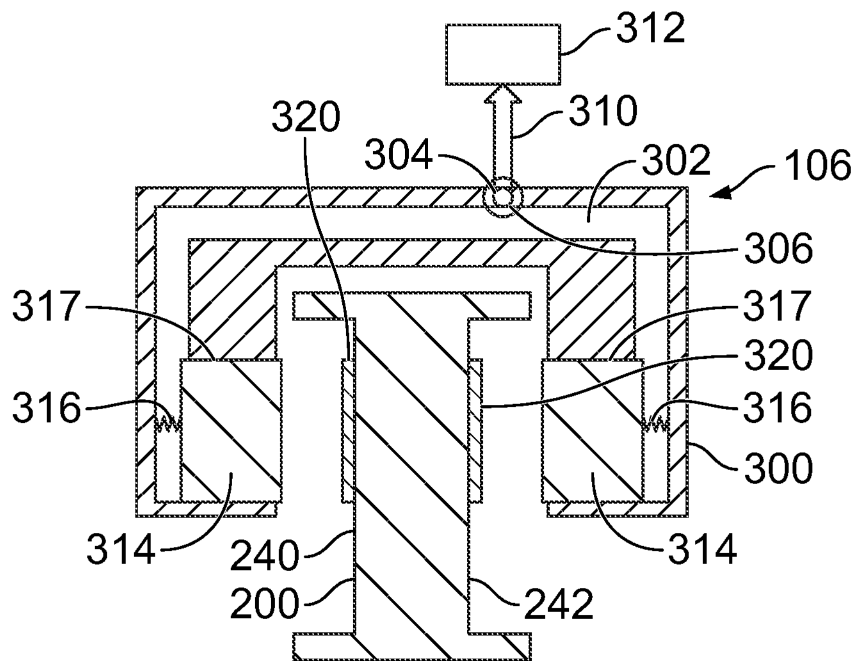
FIG. 5 illustrates a cross-sectional view of a brake disengaged from a track through line 5-5 of FIG. 3, according to an example of the present disclosure.

FIG. 5 illustrates a cross-sectional view of the brake 106 disengaged from the track 200 through line 5-5 of FIG. 3, according to an example of the present disclosure. In at least one example, the brake 106 includes a main housing 300 disposed around a portion of the track 200. For example, the main housing 300 extends around an upper portion of the track 200. Optionally, the main housing 300 extends around a lower portion of the track 200. The main housing 300 can be a caliper housing, for example, The main housing 300 includes an internal chamber 302. A valve 304 is disposed on or within a fluid inlet 306 to the internal chamber 302. The valve 304 can be located at different positions than shown, such as upstream from the location that is shown. The fluid inlet 306 is in fluid communication with a fluid delivery line 310 in fluid communication with a fluid reservoir 312. The fluid reservoir 312 retains hydraulic fluid, such as water, oil, or the like.

Pistons 314 are secured to the main housing 300 through springs 316 secured to interior surfaces within the internal chamber 302. As shown, a first piston 314 is disposed to one side 240 of the track 200, and a second piston 314 is disposed to an opposite side 242 of the track 200. Each piston 314 is sealingly and moveably secured within a channel 317 of the main housing 300. The sides 240 and 242 can include brake material 320, such as a material that is configured to increase frictional engagement with the pistons 314.

Figure 6:
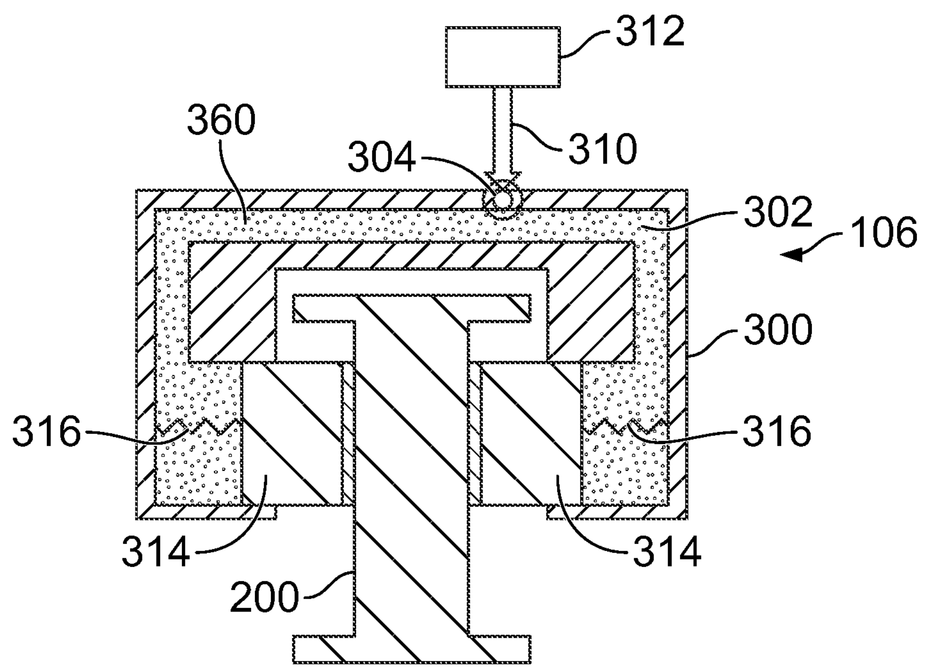
FIG. 6 illustrates a cross-sectional view of the brake engaging the track through line 5-5 of FIG. 3, according to an example of the present disclosure.

FIG. 6 illustrates a cross-sectional view of the brake 106 engaging the track 200 through line 5-5 of FIG. 3, according to an example of the present disclosure. Referring to FIGS. 1-6, when the control unit 112 determines, via the position signals 114 output from the sensors 108, that the position of the track 200 (as the portion of the flight control surface 102, in this case the slat) conforms to operation of the actuator 110, the control unit 112 refrains from operating the brake 106 to engage the track 200, as shown in FIG. 5. Conversely, if the control unit 112 determines that the position of the track 200 does not conform to the operation of the actuator 110, the control unit 112 operates the brake 106 to engage the track 200, to restrain motion of the track 200. For example, as shown in FIG. 6, in response to determining that the position of the track 200 does not conform to the operation of the actuator 110, the control unit 112 operates the valve 304, such as by opening the valve 304, to allow hydraulic fluid 360 from the fluid reservoir 312 to pass into the internal chamber 302. As the hydraulic fluid 360 passes into the internal chamber 302, the pressure of the hydraulic fluid 360 forces the pistons 314 to move toward and onto the track 200, which extends the springs 316, and clamps onto the track 200, thereby restraining motion of the track 200. In this manner, the system 100 arrests unrestrained motion of the flight control surface 102, such as the slat shown in FIGS. 3 and 4.

In at least one example, the brake 106 also includes a bypass fluid path that is configured to return the hydraulic fluid 360 back to the fluid reservoir 312 to disengage the brake 106 from the track 200. One or more valves can be disposed within the bypass fluid path. The valve(s) can be controlled by the control unit 112.

FIG. 7 illustrates a cross-sectional view of the brake 106 disengaged from the track 200 through line 5-5 of FIG. 3, according to an example of the present disclosure. FIG. 8 illustrates a cross-sectional view of the brake 106 engaging the track 200 through line 5-5 of FIG. 3, according to an example of the present disclosure. The brake 106 shown in FIGS. 7 and 8 is similar to the brake 106 shown in FIGS. 5 and 6, except that the brake 106 in FIGS. 7 and 8 can be disposed to only one side of the track 200. In this example, the brake 106 can include a single piston 314 that is configured to engage one side of the track 200.

Referring to FIGS. 1-8, the system 100 includes a brake 106 that is configured to engage and restrain at least a portion of the flight control surface 102 in response the flight control surface 102 disengaging from the actuator 110. For example, the brake 106 is configured to engage and retain the track 200 of the flight control surface 102, which can be a slat, to restrain motion thereof. In at least one example, the control unit 112 is configured to detect when the flight control surface 102 is disengaged from the actuator 110, such as via the position signal(s) 114 received from the sensor(s) 108. The system 100 is configured to prevent, minimize, or otherwise reduce unrestrained motion of the flight control surface 102 without the need for an additional actuator, which would otherwise add weight, complexity, and cost. Compared to prior known systems, the system 100 is less costly, lighter, and simpler, thereby easing integration into existing aircraft. The brakes 106 can be engaged at any point in the stroke of the track 200, for example.

In at least one example, the brake 106 includes the main housing 300 disposed in relation to the at least a portion of the flight control surface 102. For example, the main housing 300 can be in close proximity (such as within 5 feet or less), and secured around a portion of the flight control surface 102. As an example, the main housing 300 is disposed over or under a portion of the track 200 of a slat. The main housing includes the internal chamber 302. One or more pistons 314 are sealingly and moveably secured within one or more channels 317 of the main housing 300. Hydraulic fluid is configured to pass into the internal chamber 302 and force the one or more pistons 314 into engagement with the at least a portion (such as a track) of the flight control surface 102. In at least one example, the one or more pistons 314 are tethered to the main housing by one or more springs 316 within the internal chamber 302. In at least one example, the brake 106 also includes the valve 304 disposed on or within the fluid inlet 306 to the internal chamber 302. The fluid inlet 306 is in fluid communication with the fluid delivery line 310, which is in fluid communication with the fluid reservoir 312 that retains the hydraulic fluid. In at least one example, a first piston 314 is disposed to a first side of the at least a portion (such as a track) of the flight control surface 102, and a second piston 314 is disposed to a second side of the at least a portion (such as the track) of the flight control surface 102.

FIG. 9 illustrates a flow chart of a method for controlling unrestrained motion of a flight control surface of an aircraft, according to an example of the present disclosure. Referring to FIGS. 1 and 9, at 400, the actuator 110 is operated to selectively move the flight control surface 102 between desired positions. At 402, it is determined if the actuator 110 is uncoupled from the flight control surface 102. For example, the control unit 112 determines whether or not the actuator 110 is uncoupled from the flight control surface 102 through the position signals 114 received from the sensor(s) 108. If the actuator 110 is not uncoupled from the flight control surface 102, the method proceeds to 404, at which the control unit 112 refrains from engaging the flight control surface 102 with the brake 106. The method then returns to 400.

If, however, it is determined that the actuator 110 is uncoupled from the flight control surface 102 at 402, the method proceeds to 406, at which the flight control surface 102 is engaged with the brake 106, thereby restraining motion of the flight control surface 102. In this manner, the brake 106 is controlled to prevent, minimize, or otherwise reduce unrestrained motion of the flight control surface 102.

Further, the disclosure comprises examples according to the following clauses:

Clause 1. A system comprising:

a flight control surface;

an actuator configured to control motion of the flight control surface; and a brake configured to engage at least a portion of the flight control surface in response to the flight control surface disengaging from the actuator, wherein the brake is configured to arrest unrestrained motion of the flight control surface when the brake engages the at least a portion of the flight control surface.

Clause 2. The system of Clause 1, wherein the flight control surface is a slat of a wing, and wherein the at least a portion is a track of the slat.

Clause 3. The system of Clauses 1 or 2, wherein the actuator is a linear hydraulic actuator.

Clause 4. The system of any of Clauses 1-3, further comprising one or more sensors configured to detect a position of the flight control surface, wherein the position of the flight control surface is used to determine whether the flight control surface is disengaged from the actuator.

Clause 5. The system of any of Clauses 1-4, further comprising a control unit in communication with the brake, wherein the control unit is configured to determine whether the flight control surface is disengaged from the actuator, and to control operation of the brake.

Clause 6. The system of any of Clauses 1-5, wherein the brake is configured to engage the at least a portion of the flight control surface without the use of an additional actuator.

Clause 7. The system of any of Clauses 1-6, wherein the brake comprises:

a main housing disposed in relation to the at least a portion of the flight control surface, wherein the main housing includes an internal chamber; and one or more pistons sealingly and moveably secured within one or more channels of the main housing, wherein hydraulic fluid is configured to pass into the internal chamber and force the one or more pistons into engagement with the at least a portion of the flight control surface.

Clause 8. The system of Clause 7, wherein the one or more pistons are tethered to the main housing by one or more springs within the internal chamber.

Clause 9. The system of Clause 8, wherein the brake further comprises a valve disposed on or within a fluid inlet to the internal chamber.

Clause 10. The system of Clause 9, wherein the fluid inlet is in fluid communication with a fluid delivery line in fluid communication with a fluid reservoir that retains the hydraulic fluid.

Clause 11. The system of any of Clauses 7-10, where the one or more pistons comprise:

a first piston disposed to a first side of the at least a portion of the flight control surface; and a second piston disposed to a second side of the at least a portion of the flight control surface.

Clause 12. A method comprising:

controlling, by an actuator, motion of a flight control surface;

engaging, by a brake, at least a portion of the flight control surface in response to the flight control surface disengaging from the actuator; and arresting, by said engaging, unrestrained motion of the flight control surface.

Clause 13. The method of Clause 12, wherein the flight control surface is a slat of a wing, and wherein the at least a portion is a track of the slat, and wherein the actuator is a linear hydraulic actuator.

Clause 14. The method of Clauses 12 or 13, further comprising:

detecting, by one or more sensors, a position of the flight control surface; and using the position of the flight control surface to determine whether the flight control surface is disengaged from the actuator.

Clause 15. The method of any of Clauses 12-14, further comprising:

determining, by a control unit in communication with the brake, whether the flight control surface is disengaged from the actuator; and controlling, by the control unit, operation of the brake.

Clause 16. The method of any of Clauses 12-15, wherein said engaging occurs without the use of an additional actuator.

Clause 17. The method of any of Clauses 12-16, wherein the brake comprises:

a main housing disposed in relation to the at least a portion of the flight control surface, wherein the main housing includes an internal chamber; and one or more pistons sealingly and moveably secured within one or more channels of the main housing, wherein the one or more pistons are tethered to the main housing by one or more springs within the internal chamber, wherein hydraulic fluid is configured to pass into the internal chamber and force the one or more pistons into engagement with the at least a portion of the flight control surface.

Clause 18. The method of Clause, wherein the brake further comprises a valve disposed on or within a fluid inlet to the internal chamber, and wherein the fluid inlet is in fluid communication with a fluid delivery line in fluid communication with a fluid reservoir that retains the hydraulic fluid.

Clause 19. An aircraft comprising:

a wing including a slat having a track;

a linear hydraulic actuator configured to control motion of the slat;

one or more sensors configured to detect a position of the slat, wherein the position of the slat is used to determine whether the slat is disengaged from the actuator;

a brake configured to engage the track of the slat in response to the slat disengaging from the linear hydraulic actuator; and a control unit in communication with the brake, wherein the control unit is configured to determine whether the slat is disengaged from the linear hydraulic actuator, and control operation of the brake, wherein the brake is configured to arrest unrestrained motion of the slat when the brake engages the track of the slat, and wherein the brake is configured to engage the track of the slat without the use of an additional actuator.

Clause 20. The aircraft of Clause 19, wherein the brake comprises:

a main housing disposed in relation to the track of the slat, wherein the main housing includes an internal chamber;

a valve disposed on or within a fluid inlet to the internal chamber, and wherein the fluid inlet is in fluid communication with a fluid delivery line in fluid communication with a fluid reservoir that retains a hydraulic fluid; and one or more pistons sealingly and moveably secured within one or more channels of the main housing, wherein the one or more pistons are tethered to the main housing by one or more springs within the internal chamber, wherein the hydraulic fluid is configured to pass into the internal chamber and force the one or more pistons into engagement with the track of the slat.

As described herein, examples of the present disclosure provide systems and methods configured to arrest unrestrained flight control surface motion. The systems and methods effectively and efficiently arrest unrestrained flight control surface motion, such as without the use of a secondary actuator or complex method of restraining free motion. As described herein, examples of the present disclosure provide such systems and methods having significant cost, weight, and complexity savings over prior known systems and methods.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:

a flight control surface;

an actuator configured to control motion of the flight control surface; and a brake configured to move from a first position, in which the brake is disengaged from the flight control surface, to a second position, in which the brake directly engages at least a portion of the flight control surface, in response to the flight control surface disengaging from the actuator, wherein the brake is configured to arrest unrestrained motion of the flight control surface when the brake engages the at least a portion of the flight control surface.

2. The system of claim 1, wherein the flight control surface is a slat of a wing, and wherein the at least a portion of the flight control surface is a track of the slat.

3. The system of claim 1, wherein the actuator is a linear hydraulic actuator.

4. The system of claim 1, further comprising one or more sensors configured to detect a position of the flight control surface, wherein the position of the flight control surface is used to determine whether the flight control surface is disengaged from the actuator.

5. The system of claim 1, further comprising a control unit in communication with the brake, wherein the control unit is configured to determine whether the flight control surface is disengaged from the actuator, and to control operation of the brake.

6. The system of claim 1, wherein the brake is configured to engage the at least a portion of the flight control surface without the use of an additional actuator.

7. The system of claim 1, wherein the brake comprises:

a main housing disposed in relation to the at least a portion of the flight control surface, wherein the main housing includes an internal chamber; and one or more pistons sealingly and moveably secured within one or more channels of the main housing, wherein hydraulic fluid is configured to pass into the internal chamber and force the one or more pistons into engagement with the at least a portion of the flight control surface.

8. The system of claim 7, wherein the one or more pistons are tethered to the main housing by one or more springs within the internal chamber.

9. The system of claim 8, wherein the brake further comprises a valve disposed on or within a fluid inlet to the internal chamber.

10. The system of claim 9, wherein the fluid inlet is in fluid communication with a fluid delivery line in fluid communication with a fluid reservoir that retains the hydraulic fluid.

11. The system of claim 7, where the one or more pistons comprise:

a first piston disposed to a first side of the at least a portion of the flight control surface; and a second piston disposed to a second side of the at least a portion of the flight control surface.

12. A method comprising:

controlling, by an actuator, motion of a flight control surface;

in response to the flight control surface disengaging from the actuator, moving a brake from a first position, in which the brake is disengaged from the flight control surface, to a second position, in which the brake directly engages at least a portion of the flight control surface; and arresting, by the brake engaging the at least a portion of the flight control surface, unrestrained motion of the flight control surface.

13. The method of claim 12, wherein the flight control surface is a slat of a wing, and wherein the at least a portion of the flight control surface is a track of the slat, and wherein the actuator is a linear hydraulic actuator.

14. The method of claim 12, further comprising:

detecting, by one or more sensors, a position of the flight control surface; and using the position of the flight control surface to determine whether the flight control surface is disengaged from the actuator.

15. The method of claim 12, further comprising:

determining, by a control unit in communication with the brake, whether the flight control surface is disengaged from the actuator; and controlling, by the control unit, operation of the brake.

16. The method of claim 12, wherein the brake engages the at least a portion of the flight control surface without the use of an additional actuator.

17. The method of claim 12, wherein the brake comprises:

a main housing disposed in relation to the at least a portion of the flight control surface, wherein the main housing includes an internal chamber; and one or more pistons sealingly and moveably secured within one or more channels of the main housing, wherein the one or more pistons are tethered to the main housing by one or more springs within the internal chamber, wherein hydraulic fluid is configured to pass into the internal chamber and force the one or more pistons into engagement with the at least a portion of the flight control surface.

18. The method of claim 17, wherein the brake further comprises a valve disposed on or within a fluid inlet to the internal chamber, and wherein the fluid inlet is in fluid communication with a fluid delivery line in fluid communication with a fluid reservoir that retains the hydraulic fluid.

19. An aircraft comprising:

a wing including a slat having a track;

a linear hydraulic actuator configured to control motion of the slat;

one or more sensors configured to detect a position of the slat, wherein the position of the slat is used to determine whether the slat is disengaged from the linear hydraulic actuator;

a brake configured to move from a first position, in which the brake is disengaged from the track, to a second position, in which the brake directly engages the track of the slat, in response to the slat disengaging from the linear hydraulic actuator; and a control unit in communication with the brake, wherein the control unit is configured to determine whether the slat is disengaged from the linear hydraulic actuator, and control operation of the brake, wherein the brake is configured to arrest unrestrained motion of the slat when the brake engages the track of the slat, and wherein the brake is configured to engage the track of the slat without the use of an additional actuator.

20. The aircraft of claim 19, wherein the brake comprises:

a main housing disposed in relation to the track of the slat, wherein the main housing includes an internal chamber;

a valve disposed on or within a fluid inlet to the internal chamber, and wherein the fluid inlet is in fluid communication with a fluid delivery line in fluid communication with a fluid reservoir that retains a hydraulic fluid; and one or more pistons sealingly and moveably secured within one or more channels of the main housing, wherein the one or more pistons are tethered to the main housing by one or more springs within the internal chamber, wherein the hydraulic fluid is configured to pass into the internal chamber and force the one or more pistons into engagement with the track of the slat.

* * * * *